United States Patent
Heydenrych et al.

(10) Patent No.: US 12,311,293 B2
(45) Date of Patent: May 27, 2025

(54) FILTER HEAD ASSEMBLY HAVING A THREADED BAYONET CONNECTOR ADAPTER WITH A POSITION TOLERANCE IMPROVING RETAINER RING

(71) Applicant: MANN+HUMMEL GmbH, Ludwigsburg, DE (US)

(72) Inventors: Zack Heydenrych, Kalamazoo, MI (US); Christoph Baumann, Kalamazoo, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 559 days.

(21) Appl. No.: 17/829,830

(22) Filed: Jun. 1, 2022

(65) Prior Publication Data
US 2023/0249108 A1    Aug. 10, 2023

(51) Int. Cl.
*B01D 35/00*   (2006.01)
*B01D 35/30*   (2006.01)

(52) U.S. Cl.
CPC ........... *B01D 35/005* (2013.01); *B01D 35/30* (2013.01); *B01D 2201/0461* (2013.01); *B01D 2201/4015* (2013.01); *B01D 2201/4084* (2013.01); *B01D 2201/4092* (2013.01)

(58) Field of Classification Search
CPC .................. B01D 35/005; B01D 35/30; B01D 2201/0461; B01D 2201/4015; B01D 2201/4084; B01D 2201/4092; B01D 2201/301; B01D 2201/4007; B01D 29/96; B01D 2201/4046; B01D 2201/4076; B01D 35/306; B01D 2201/4023
See application file for complete search history.

(56) References Cited

U.S. PATENT DOCUMENTS

| | | | |
|---|---|---|---|
| 4,764,275 A | 8/1988 | Robichaud | |
| 5,395,509 A | 3/1995 | Guerra Cisneros et al. | |
| 5,770,065 A * | 6/1998 | Popoff | F02M 37/16 |
| | | | 210/450 |
| 5,972,210 A | 10/1999 | Munkel et al. | |
| 7,150,828 B2 | 12/2006 | Sakata et al. | |
| 8,128,817 B2 | 3/2012 | Roesgen | |
| 8,182,681 B2 | 5/2012 | Maier et al. | |
| 9,132,367 B2 | 9/2015 | Honermann et al. | |
| 9,670,805 B2 | 6/2017 | Wildermuth et al. | |
| 9,731,236 B2 | 8/2017 | Girondi | |
| 10,035,087 B2 | 7/2018 | Vercammen | |

(Continued)

FOREIGN PATENT DOCUMENTS

| | | |
|---|---|---|
| CN | 203990014 U | 12/2014 |
| DE | 3048219 A1 | 7/1982 |

(Continued)

*Primary Examiner* — Waqaas Ali (57) ABSTRACT

A filter head assembly includes a filter head and a threaded bayonet connection adapter having a rotational position tolerance improving retainer ring. The rotational position tolerance improving retainer ring providing for and enabling the critical further deformation of the rotational position tolerance improving retainer ring beyond the predetermined final assembly torque to achieve the required critical final rotational position of the threaded bayonet connection adapter for the correct operation of the open and locked position indicators on the filter head.

14 Claims, 11 Drawing Sheets

(56) References Cited

U.S. PATENT DOCUMENTS

| | | | |
|---|---|---|---|
| 10,399,010 | B2 | 9/2019 | Thalmann et al. |
| 10,399,012 | B2 | 9/2019 | Thalmann et al. |
| 10,518,202 | B2 | 12/2019 | Hales et al. |
| 10,561,967 | B2 | 2/2020 | Jokschas et al. |
| 11,027,227 | B2 | 6/2021 | Thalmann et al. |
| 2003/0173281 | A1 | 9/2003 | Wright et al. |
| 2006/0118474 | A1 | 6/2006 | Kolczyk et al. |
| 2008/0237113 | A1 | 10/2008 | Jensen |
| 2012/0261325 | A1 | 10/2012 | Brown et al. |
| 2017/0292418 | A1 | 10/2017 | Thalmann et al. |
| 2020/0139288 | A1 | 5/2020 | Decugniere |
| 2022/0088506 | A1 | 3/2022 | Thalmann et al. |
| 2022/0134262 | A1 | 5/2022 | Thalmann et al. |
| 2022/0143531 | A1 | 5/2022 | Postel et al. |

FOREIGN PATENT DOCUMENTS

| | | | |
|---|---|---|---|
| DE | 102013011620 | A1 | 1/2015 |
| DE | 102013020499 | A1 | 6/2015 |
| DE | 102015000342 | A1 | 7/2015 |
| JP | 2000288317 | A | 10/2000 |
| JP | 3653802 | B2 | 6/2005 |
| WO | 21009098 | A1 | 1/2021 |

\* cited by examiner

FILTER HEAD ASSEMBLY HAVING A THREADED BAYONET CONNECTOR ADAPTER WITH A POSITION TOLERANCE IMPROVING RETAINER RING

TECHNICAL FIELD

The present disclosure relates to threaded bayonet connection adapters having rotational position tolerance improving retainer ring, the threaded bayonet connection adapter for connecting an exchangeable filter to a filter head.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Early engine oil filters had a permanent housing containing a replaceable filter. In the mid-1950s, a spin-on filter design was introduced that included a self-contained housing and filter assembly that could be unscrewed from an engine block, discarded, and replaced with a new one. Typically, the spin-on filter must be rotated through several turns to assemble or disassemble the spin-on filter to or from the engine block.

More recently, automotive companies have developed filter head assemblies that attach an oil filter to an engine via a bayonet connection and that transport oil between the oil filter and the engine. In contrast to a spin-on filter connection, the bayonet connection enables assembling or disassembling an oil filter to or from an engine with a partial turn. Thus, such filter head assemblies reduce the time and effort required to replace an oil filter.

SUMMARY

An example of a filter head assembly according to the present disclosure includes a filter head and threaded bayonet connection adapter having a rotational position tolerance improving retainer ring. In one aspect of the invention the filter head is configured to be attached, for example, to an engine block and to enable fluid flow (for example, oil, fuel or other fluids) between, for example, an engine block and a filter connected to the filter head.

The filter head includes a base and a tubular body protruding from the base, the tubular body defining threads. The threaded bayonet connection adapter is configured to connect the filter to the filter head via a bayonet connection. The threaded bayonet connection adapter includes an annular body defining threads configured to engage the threads on the tubular body of the filter head to attach the threaded bayonet connection adapter to the filter head.

In one aspect, the base of the filter head includes a disc-shaped body, and the tubular body protrudes from disc-shaped body along a central axis thereof.

In one aspect, the threads on the filter head are external threads on an outer radial surface of the tubular body, and the threads on the threaded bayonet connection adapter are internal threads on an inner radial surface of the annular body.

In one aspect, the threaded bayonet connection adapter further includes tabs protruding radially outward from the annular body thereof and configured to be inserted into corresponding slots in an axial end wall of the oil filter.

In one aspect, the annular body of the threaded bayonet connection adapter includes a first portion having a straight sidewall and a second portion having a curved sidewall. The first portion of the annular body defines the threads on the annular body. The tabs protrude radially outward from an axial end of the second portion of the annular body.

In one aspect, the filter head assembly further includes a spring configured to bias the oil filter away from the filter head and thereby inhibit rotation of the tabs on the threaded bayonet connection adapter out of the slots in the oil filter.

In one aspect, the filter head assembly further includes a rotational position tolerance improving retainer ring configured to be assembled between the bayonet connector and the filter head and to hold the spring in place relative to the filter head.

In one aspect, the spring includes straight segments disposed in a common plane and u-shaped segments joining the straight segments to one another and protruding out of the plane, the straight segments of the spring are configured to be clamped between the retainer ring and the filter head, and the u-shaped segments of the spring are configured to apply a biasing force to the axial end wall of the oil filter urging the oil filter away from the filter head.

In one aspect, the rotational position tolerance improving retainer ring is made of aluminum, brass, copper, or combinations thereof.

In one aspect, the rotational position tolerance improving retainer ring is configured to advantageously deform under a load applied by the threaded bayonet connection adapter when the threaded bayonet connection adapter is tightened onto the filter head to at least a predetermined final assembly torque. Critically and importantly, the rotational position tolerance improving retainer ring configured to be further deformable to permit required further rotation beyond the predetermined final assembly torque to align the threaded bayonet connection adapter to a required rotational position on the filter head such the open and locked position indications on the filter head agree with the actual open and locked positions of the filter element on the filter head. This is critical to a correct operation of the open and locked position indicators on the filter head.

In one aspect, the tabs have V-shaped lower surfaces configured to engage corresponding V-shaped upper surfaces of the axial end wall of the oil filter adjacent to the slots to inhibit rotation of the tabs out of the slots.

In one aspect, the filter head assembly is configured to hold the oil filter in place relative to the engine block when the axial end wall of the oil filter is pressed toward the filter head to overcome a biasing force of the spring and the oil filter is rotated relative to the filter head until the tabs on the bayonet connector are received in the slots on the axial end wall of the oil filter and the V-shaped lower surfaces on the tabs engage the V-shaped upper surfaces of the axial end wall.

In one aspect, the filter head is made of aluminum, and the bayonet connector is made of steel.

In one aspect, the threads on the filter head are external threads on an outer radial surface of the tubular body of the filter head, the threads on the threaded bayonet connection adapter are internal threads on an inner radial surface of the annular body of the threaded bayonet connection adapter, and the threaded bayonet connection adapter further includes tabs protruding radially outward from the annular body of the bayonet connector and configured to be inserted into corresponding slots in an axial end wall of the oil filter.

An example of a threaded bayonet connection adapter according to the present disclosure is for connecting an oil filter to a filter head via a bayonet connection. The threaded bayonet connection adapter includes an annular body and tabs. The annular body defines threads configured to engage threads on the filter head to attach the threaded bayonet connection adapter to the filter head. The tabs protrude from the annular body and are configured to be inserted into corresponding slots in an axial end wall of the oil filter to attach the oil filter to the threaded bayonet connection adapter.

In one aspect, the threads on the threaded bayonet connection adapter are internal threads on an inner radial surface of the annular body, and the tabs protrude radially outward from the annular body.

In one aspect, the annular body includes a first portion having a straight sidewall and a second portion having a curved sidewall. The first portion of the annular body defines the threads on the annular body. The tabs protrude radially outward from an axial end of the second portion of the annular body.

In one aspect, the tabs have V-shaped lower surfaces configured to engage corresponding V-shaped upper surfaces of the axial end wall of the oil filter adjacent to the slots to inhibit rotation of the tabs out of the slots.

An example of a method of forming a threaded bayonet connection adapter for connecting an oil filter to a filter head via a bayonet connection according to the present disclosure includes drawing a blank in a first direction to form at least a portion of an annular body, and drawing the blank in a second direction to form tabs protruding radially outward from the annular body. The annular body and the tabs collectively make up the threaded bayonet connection adapter. The tabs are configured to be inserted into corresponding slots in an axial end wall of the oil filter to attach the oil filter to the threaded bayonet connection adapter and thereby to the filter head.

In one aspect, the method further includes drawing the blank in the first direction to form a first portion of the annular body, and drawing the blank in the second direction to form a second portion of the annular body and the tabs. The tabs protrude radially outward from an axial end of the second portion of the annular body.

In one aspect, the method further includes forming internal threads on an inner radial surface of the annular body. The internal threads on the annular body are configured to engage external threads on the filter head to attach the threaded bayonet connection adapter to the filter head.

In one aspect, the second direction in which the blank is drawn is opposite of the first direction in which the blank is drawn.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
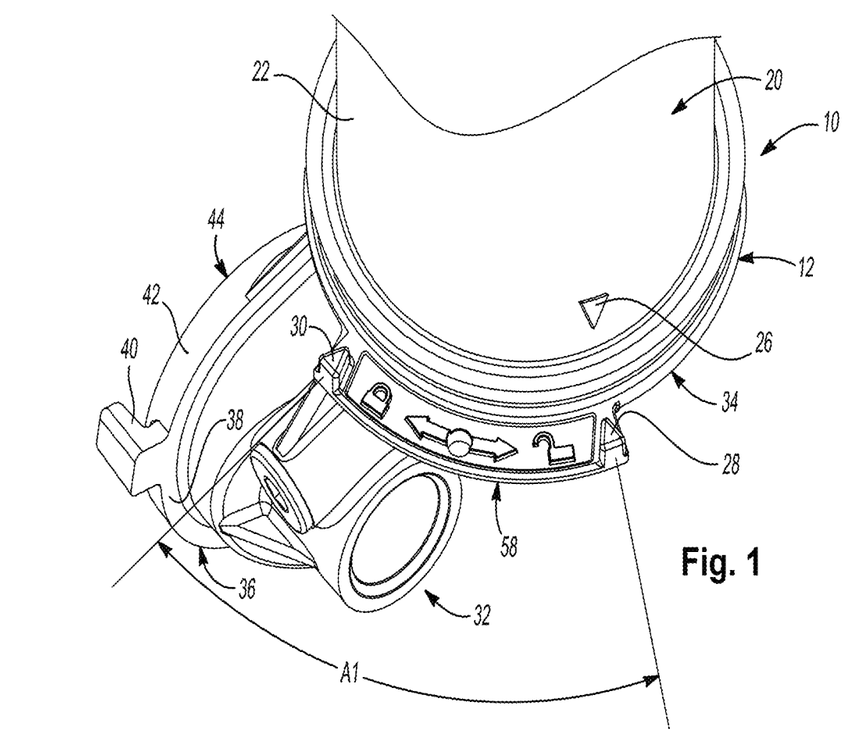
FIG. 1 is a perspective view of a filter head assembly according to the present disclosure including a filter head and a threaded bayonet connection adapter with a rotational position tolerance improving retainer ring for connecting an oil filter to the filter head, with the oil filter shown in its unlocked position relative to the filter head.
Figure 2:
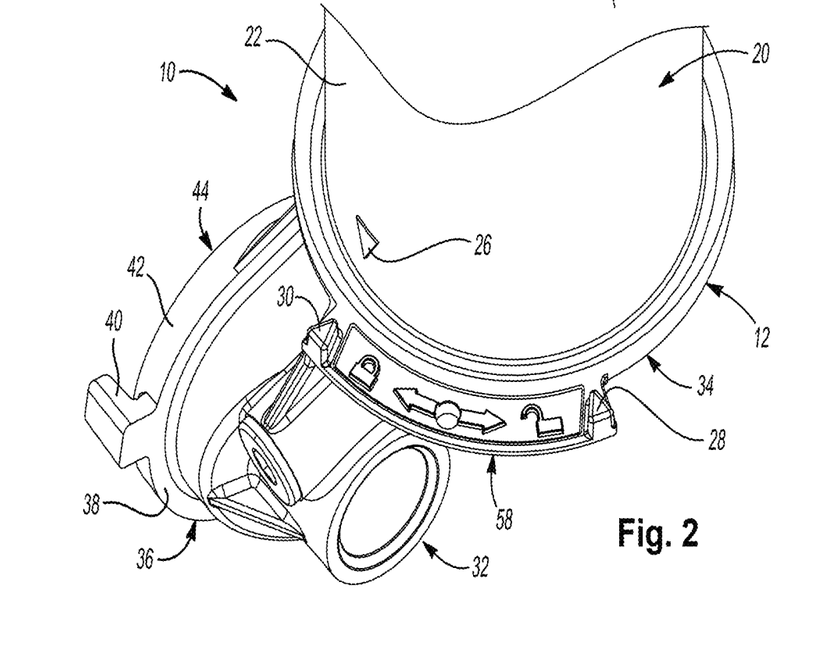
FIG. 2 is a perspective view of a filter head assembly according to the present disclosure including a filter head and a threaded bayonet connection adapter and rotational position tolerance improving retainer ring for connecting an oil filter to the filter head, with the oil filter shown in its locked position relative to the filter head.
Figure 3:
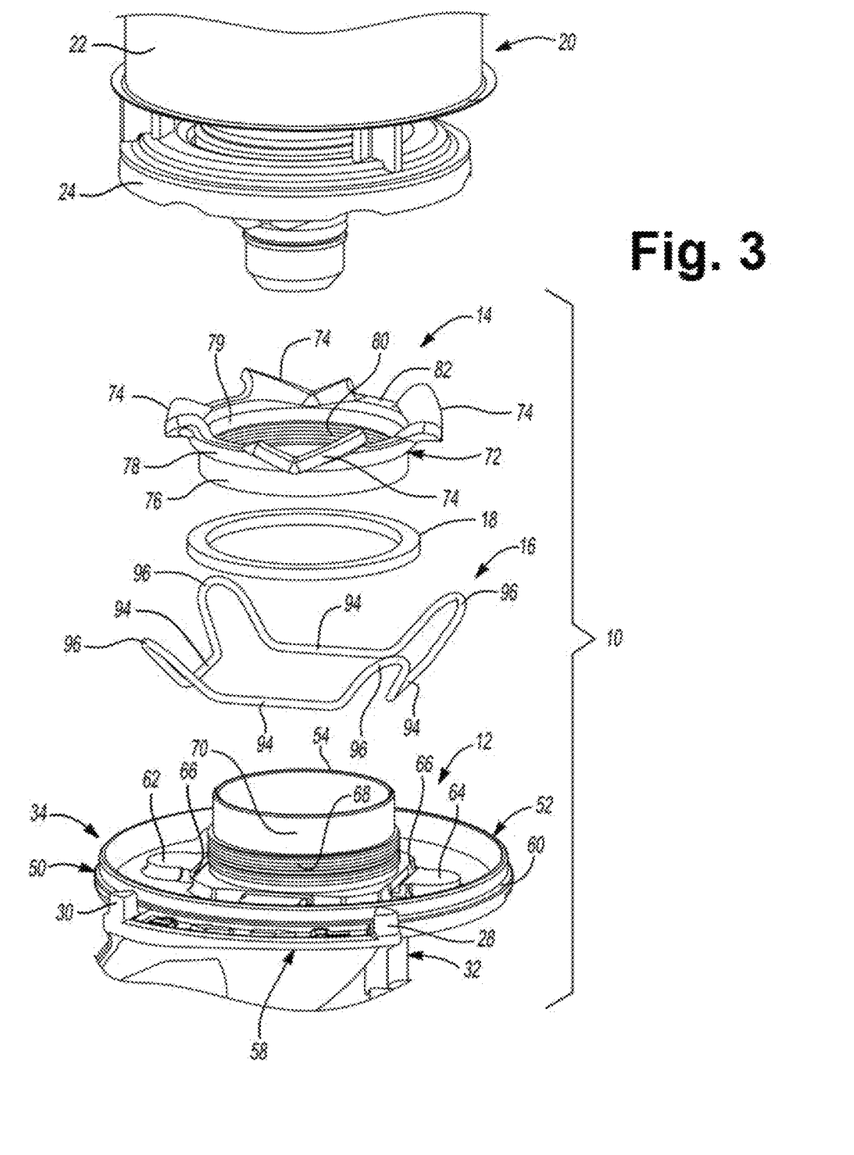
FIG. 3 is an exploded perspective view of the filter head assembly of FIG. 1.

Referring now to FIGS. 1 through 3, a filter head assembly 10 includes a filter head 12, a threaded bayonet connection adapter 14, a spring 16, and a rotational position tolerance improving retainer ring 18 (FIGS. 3 and 11-14). The filter head 12 is attachable to an engine block (not shown) using, for example, fasteners. When the filter head 12 is attached to the engine block, the filter head 12 enables oil flow between the engine block and an oil filter 20 connected to the filter head 12. The filter head 12 may be made of aluminum.

The oil filter 20 filters engine oil that flows through the oil filter 20. The oil filter 20 is rotatable relative to the filter head 12 between an unlocked position shown in FIG. 1 and a locked position shown in FIG. 2. When the oil filter 20 is in its locked position, the filter head 12 secures the oil filter 20 to the engine block. When the oil filter 20 is in its unlocked position, the oil filter 20 can be removed from the filter head 12. In the example shown, the oil filter 20 is rotated through an angle A1 degrees to adjust the oil filter 20 between its unlocked and locked positions.

The oil filter 20 includes a cylindrical sidewall 22 and an axial end wall 24. The cylindrical sidewall 22 of the oil filter 20 has a lock indicator 26, and the filter head 12 has an unlock indicator 28 and a locked indicator 30. Alignment of the lock indicator 26 on the oil filter 20 with the unlock indicator 28 on the filter head 12 as shown in FIG. 1 indicates that the oil filter 20 is not locked to the filter head 12. Alignment of the lock indicator 26 on the oil filter 20 with the lock indicator 30 on the filter head 12 as shown in FIG. 2 indicates that the oil filter is locked to the filter head 12. The rotational position tolerance improving retainer ring 18 is critical to achieving the correct alignment of the threaded bayonet connection adapter 14 on the filter head 12 so the locked in unlocked positions correctly correspond to the locked and unlocked indications on the filter head.

Figure 4:
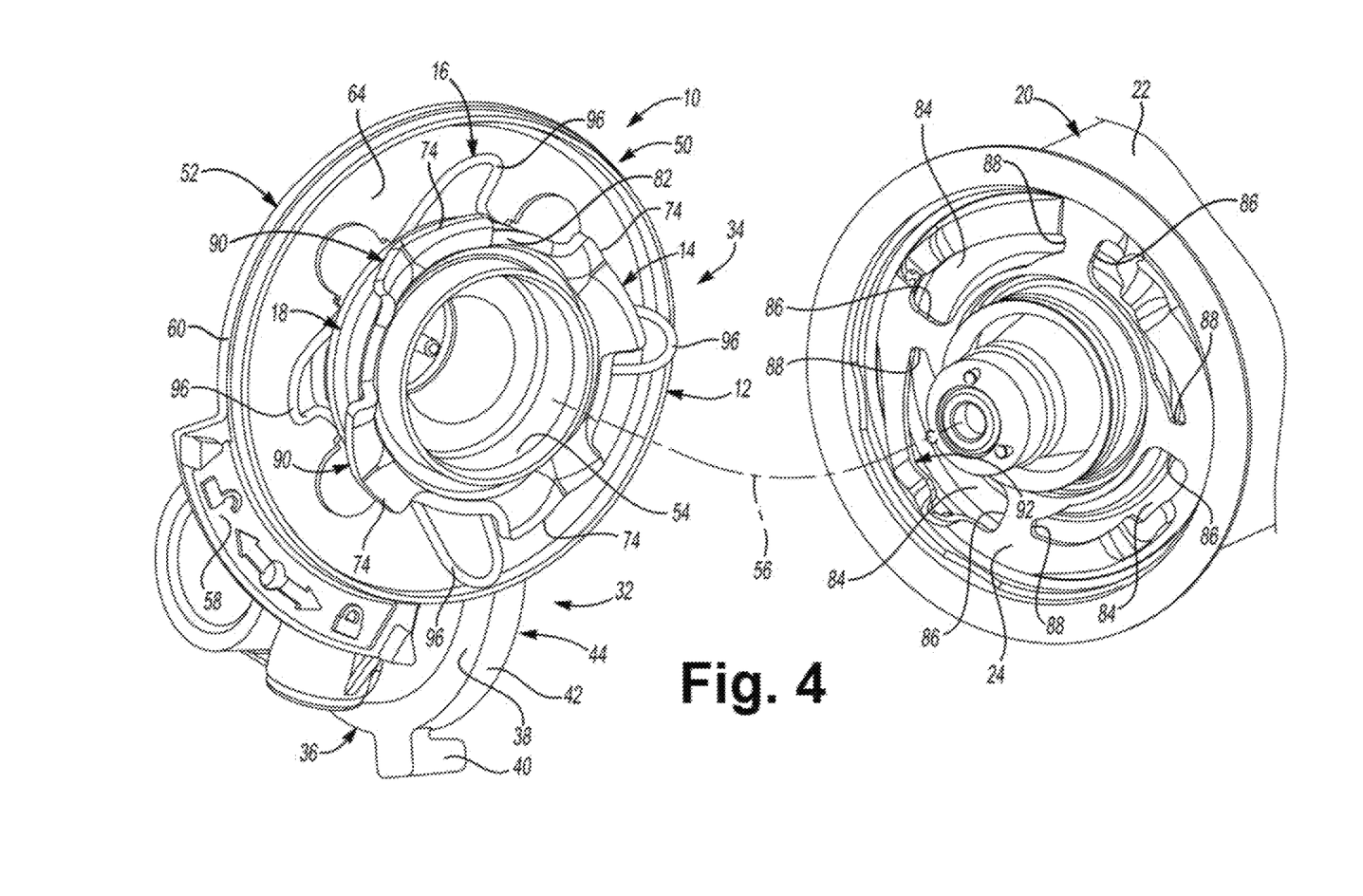
FIG. 4 is a perspective view of the filter head assembly of FIG. 1 and a portion of the oil filter of FIG. 1.
Figure 5:
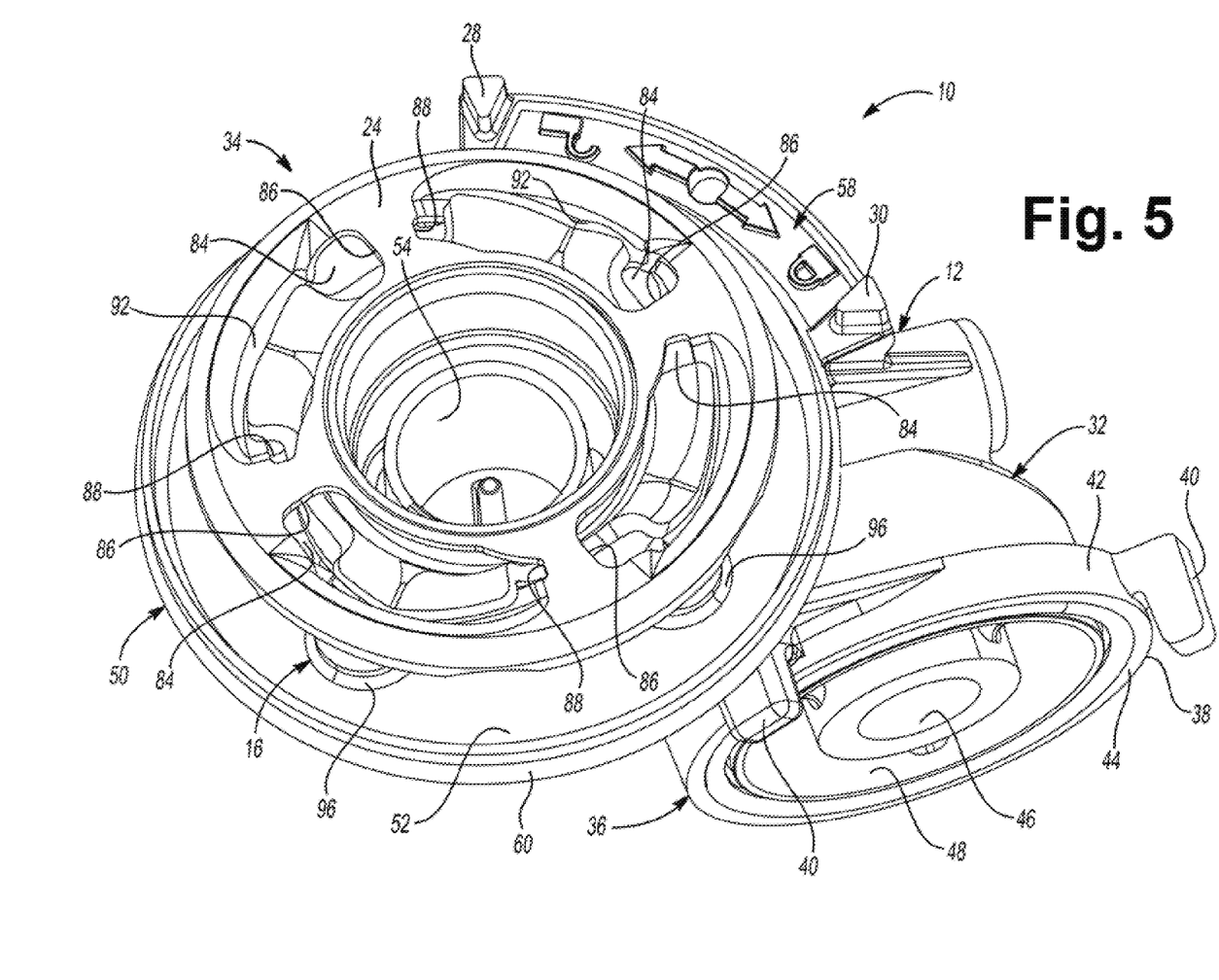
FIG. 5 is a perspective view of the filter head assembly of FIG. 1 and an axial end wall of the oil filter of FIG. 1.

With additional reference to FIGS. 4 and 5, the filter head 12 includes an engine attachment portion 32 and a filter support portion 34. The engine attachment portion 32 of the filter head 12 includes a base 36 having a disk-shaped body 38 and tabs 40 protruding from an outer radial surface 42 of the disk-shaped body 38. The disk-shaped body 38 of the engine attachment portion 32 has an engine mounting surface 44 that abuts the engine block when the filter head 12 is attached thereto. The tabs 40 of the engine attachment portion 32 can be used to locate the filter head 12 relative to the engine block when attaching the filter head 12 thereto. As best shown in FIG. 5, the base 36 of the engine attachment portion 32 defines an inlet port 46 that receives oil from the engine block and an outlet port 48 that returns filtered oil to the engine block.

The filter support portion 34 of the filter head 12 includes a base 50 having a disk-shaped body 52, a tubular body 54 protruding from the base 50 along a central axis 56 thereof, and a lock indicator tab 58 protruding from an outer radial surface 60 of the base 50. The base 50 of the filter support portion 34 further includes a spring retention boss 62 (FIG. 3) protruding from a top surface 64 of the disk-shaped body 52 and defining grooves 66 that receive the spring 16. The tubular body 54 of the filter support portion 34 defines external threads 68 on an outer radial surface 70 thereof. The unlock and lock indicators 28 and 30 are disposed on the lock indicator tab 58.

Figure 6:
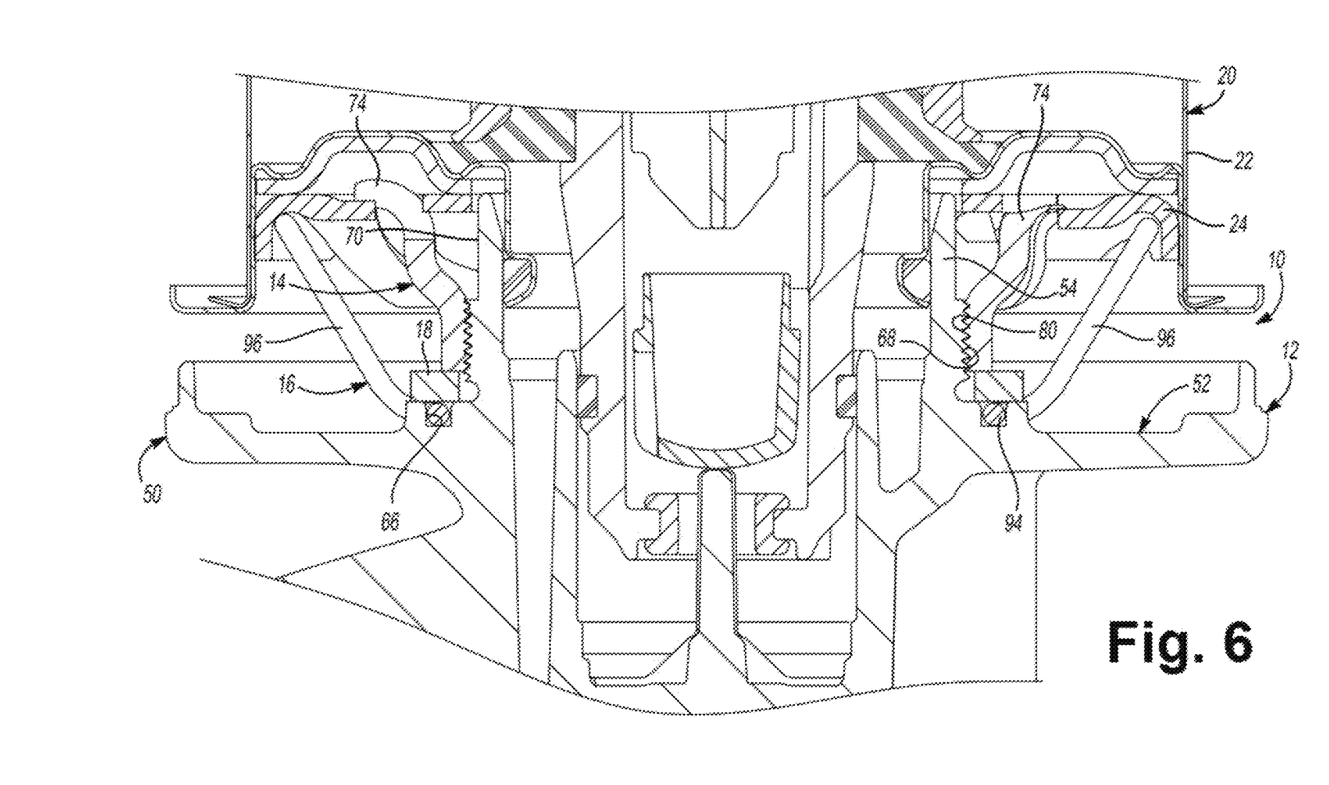
FIG. 6 is a section view of the filter head assembly of FIG. 1 and a portion of the oil filter of FIG. 1.
Figure 7:
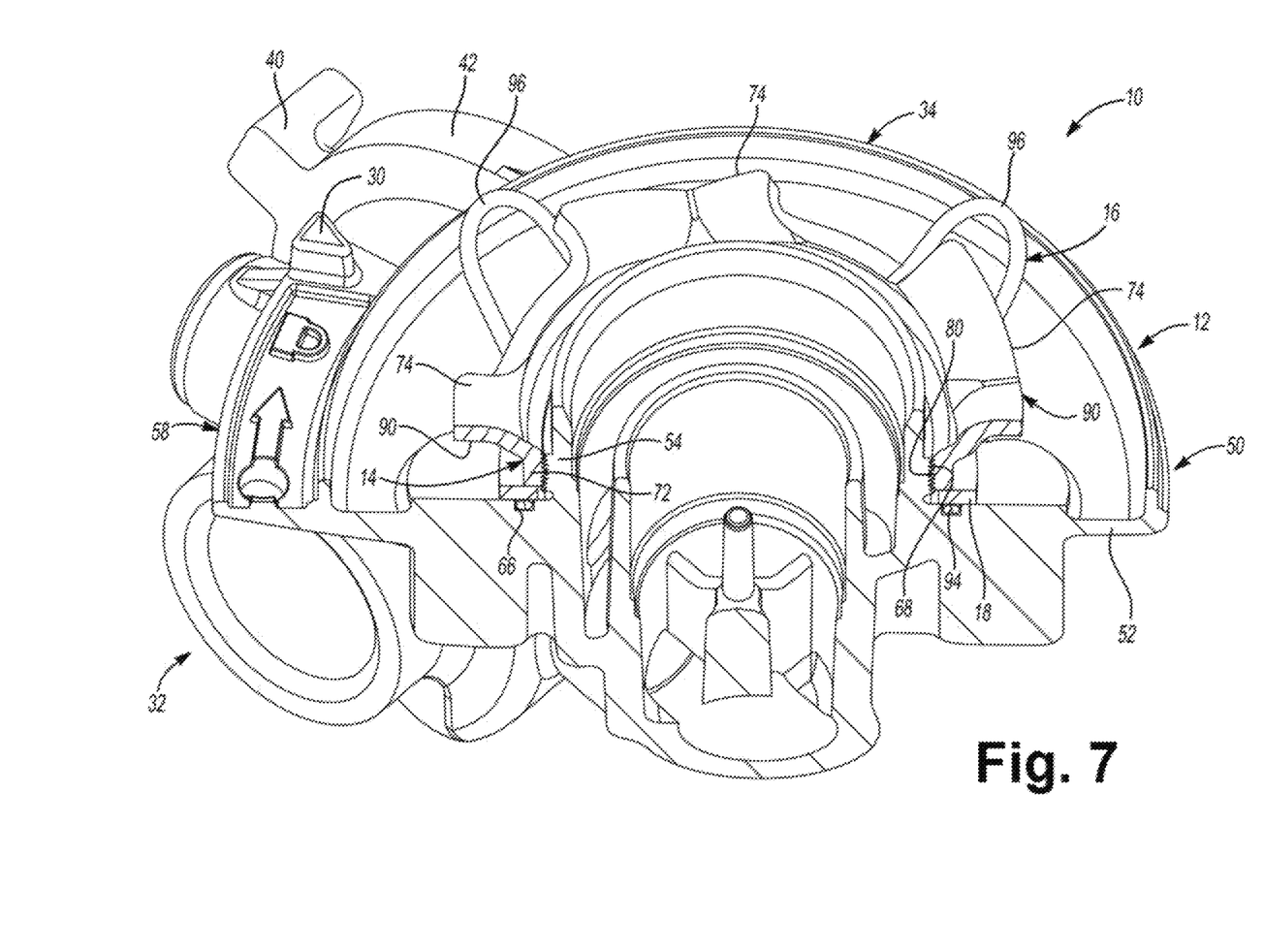
FIG. 7 is a sectioned perspective view of the filter head assembly of FIG. 1.

The threaded bayonet connection adapter 14 connects the oil filter 20 to the filter head 12 via a bayonet connection. The threaded bayonet connection adapter 14 may be made of steel. As best shown in FIG. 3, the threaded bayonet connection adapter 14 includes an annular body 72 and tabs 74 protruding radially outward from the annular body 72. The annular body 72 of the threaded bayonet connection adapter 14 includes a first portion 76 having a straight sidewall and a second portion 78 having a curved sidewall. An inner radial surface 79 of the annular body 72 defines internal threads 80 that engage the external threads 68 on the tubular body 54 of the filter head 12 as shown in FIGS. 6 and 7.

The tabs 74 of the threaded bayonet connection adapter 14 protrude radially outward from an axial end 82 of the second portion 78 of the annular body 72. As best shown in FIGS. 4 and 5, to secure the oil filter 20 to the filter head 12, the oil filter 20 is placed onto the threaded bayonet connection adapter 14 so that the tabs 74 of the threaded bayonet connection adapter 14 project through slots 84 in the axial end wall 24 of the oil filter 20 adjacent to first ends 86 thereof. The oil filter 20 is then rotated until the tabs 74 of the threaded bayonet connection adapter 14 are adjacent to second ends 88 of the slots 84 in the axial end wall 24 of the oil filter 20. Rotating the oil filter 20 so that the tabs 74 on the bayonet connector 14 move through the slots 84 in the axial end wall 24 of the oil filter 20 from the first ends 86 thereof to the second ends 88 thereof adjusts the oil filter 20 from its unlocked position to its locked position.

The tabs 74 of the threaded bayonet connection adapter 14 have V-shaped lower surfaces 90 that engage corresponding V-shaped upper surfaces 92 of the axial end wall 24 of the oil filter 20 adjacent to the slots 84 in the axial end wall 24. The V-shaped lower surfaces 90 of the threaded bayonet connection adapter 14 engage the V-shaped upper surfaces 92 of the oil filter 20 when the tabs 74 of the threaded bayonet connection adapter 14 are adjacent to the second ends 88 of the slots 84. The engagement between the V-shaped lower surfaces 90 of the threaded bayonet connection adapter 14 and the V-shaped upper surfaces 92 of the oil filter 20 inhibits rotation of the tabs 74 out of the slots 84 and thereby maintain the oil filter 20 in its locked position.

Referring now to FIGS. 3 through 7, the spring 16 biases the oil filter 20 away from the filter head 12 and thereby further inhibits rotation of the tabs 74 on the threaded bayonet connection adapter 14 out of the slots 84 in the oil filter 20. The spring 16 may be made of steel. The spring 16 includes straight segments 94 disposed in a common plane and u-shaped segments 96 joining the straight segments 94 to one another and protruding out of the plane. The straight segments 94 of the spring 16 are inserted into the grooves 66 in the filter head 12 and clamped between the tolerance improving retainer ring 18 (FIGS. 3 and 11-14) and the filter head 12. The u-shaped segments 96 of the spring 16 apply a biasing force to the axial end wall 24 of the oil filter 20 urging the oil filter 20 away from the filter head 12.

To secure the oil filter 20 to the filter head assembly 10, the oil filter 20 is oriented in its unlocked position with respect to the filter head 12, and the axial end wall 24 of the oil filter 20 is pressed toward the filter head 12 to overcome a biasing force of the spring 16. The oil filter 20 is then rotated relative to the filter head 12 until the tabs 74 on the threaded bayonet connection adapter 14 are received in the slots 84 on the axial end wall 24 and the V-shaped lower surfaces 90 on the tabs 74 engage the V-shaped upper surfaces 92 of the axial end wall 24. When this occurs, the oil filter 20 is in its locked position with respect to the filter head 12, and the filter head assembly 10 holds the oil filter 20 in place relative to the engine block.

As best shown in FIGS. 6 and 7, the rotational position tolerance improving retainer ring 18 according to any of FIGS. 3, 11-14 is assembled between the bayonet connector 14 and the filter head 12. The rotational position tolerance improving retainer ring 18 holds the spring 16 in place relative to the filter head 12. To assemble the filter head assembly 10, the straight segments 94 of the spring 16 are inserted into the grooves 66 in the filter head 12, and the retainer ring 18 is placed over the straight segments 94 of the spring 16. The threaded bayonet connection adapter 14 is then threaded onto the filter head 12 by engaging the internal threads 80 on the threaded bayonet connection adapter 14 with the external threads 68 on the filter head 12 and rotating the threaded bayonet connection adapter 14 bayonet connector 14 until the retainer ring 18 is clamped between the bayonet connector 14 and the filter head 12.

Figure 8:
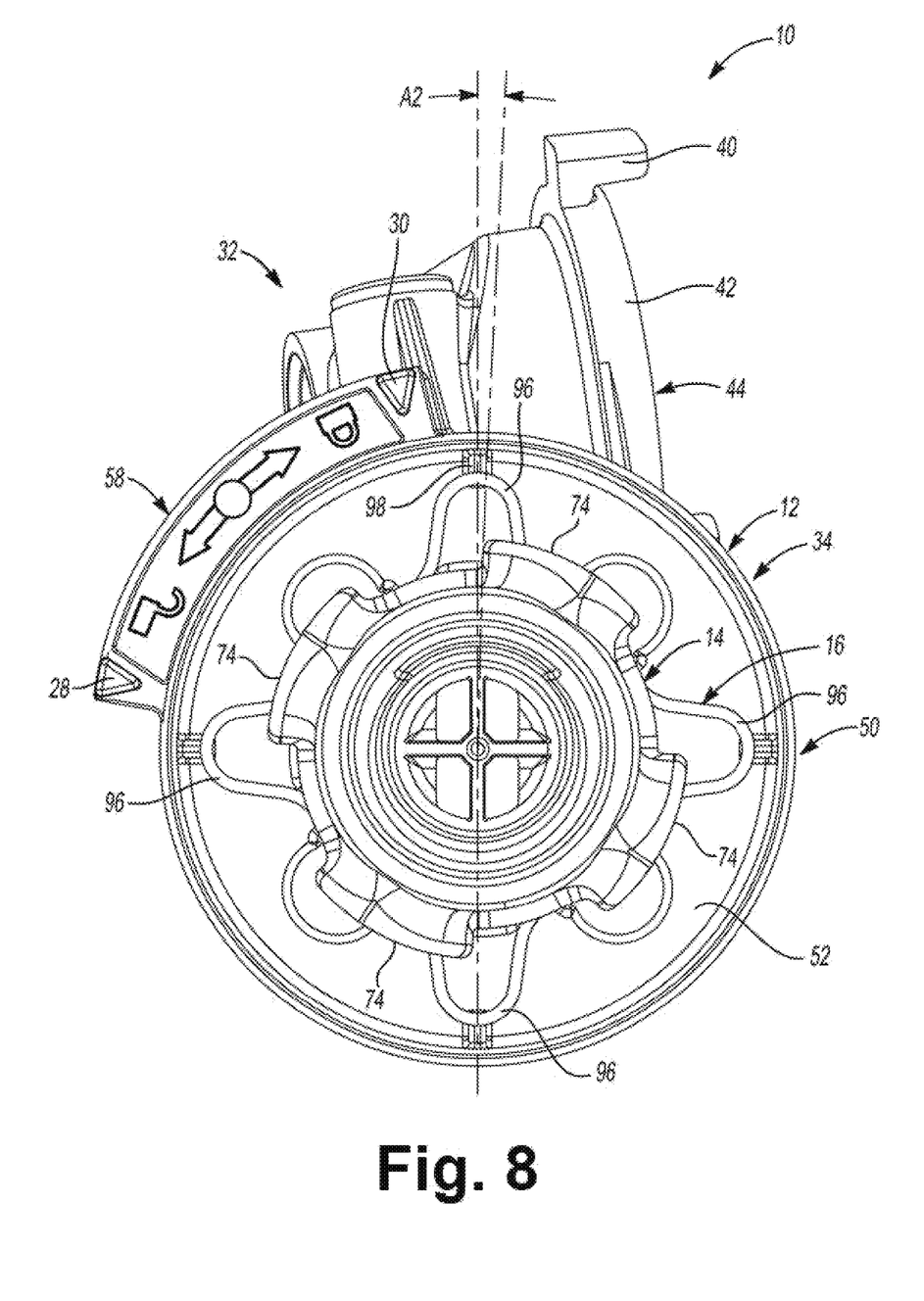
FIG. 8 is a top view of the filter head assembly of FIG. 1 illustrating the angular orientation of the threaded bayonet connection adapter relative to the filter head.

The threaded bayonet connection adapter 14 is threaded onto the filter head 12 until the torque applied to the threaded bayonet connection adapter 14 is within a predetermined torque range. The threaded bayonet connection adapter 14 is the rotated, if need, a further rotational distance until a critical predetermined angular orientation of the threaded bayonet connection adapter 14 with respect to the filter head 12 is correctly achieved. FIG. 8 illustrates an example of such a predetermined angular orientation of the threaded bayonet connection adapter 14. In FIG. 8, one of the tabs 74 on the threaded bayonet connection adapter 14 is oriented at an angle A2 of 3 degrees with respect to a visual alignment nub 98 on the filter head 12. In various implementations, the predetermined angular orientation of the threaded bayonet connection adapter 14 may be defined using other features of the filter head 12, for example the lock indicator tab 58.

Since the threaded bayonet connection adapter 14 is threaded onto the filter head 12, there are multiple factors that affect the final assembly orientation of the bayonet connector 14. These factors include the starting location of the internal threads 80 of the bayonet connector 14, the starting location of the external threads 68 on the filter head 12, and the thickness of the retainer ring 18, and the specific rotational position tolerance improving retainer ring 18 configuration selected, as shown on FIGS. 11-14. Due to the stack up of tolerances associated with these factors, without certain measures, the threaded bayonet connection adapter 14 may not be positioned at the predetermined angular orientation with respect to the filter head 12 when the filter head assembly 10 is fully assembled at the required torque. In turn, the lock indicator 26 on the oil filter 20 may be not be correctly aligned with a lock indicator 30 on the filter head 12 when the oil filter 20 is secured to the filter head 12.

Due to the stack up of tolerances of these components, there could be too much variation in the final orientation of the threaded bayonet connection adapter 14 relative to the filter head 12. The threaded bayonet connection adapter 14 could end up being out of position potentially for some assemblies, such that the rotational locked/unlocked positions of the filter 20 on the bayonet connector 14 do not properly correspond to the locked/unlocked positions on the lock indicator tab 58. For proper and reliable mounting of the filter 20, it is critical that the rotational locked/unlocked positions of the filter 20 on the bayonet connector 14 properly correspond to the locked/unlocked positions indicated on the lock indicator tab 58 of the filter head 12. This is accomplished with the rotational position tolerance improving retainer rings 18 as disclosed in FIGS. 11-14.

This critical requirement drives the need for an inventive scheme that will allow for a large window of assembly torque in order to be able to overcome these stack up tolerances, and enables and provides the threaded bayonet connection adapter 14 to be fixedly mounted with required frictional restraint onto the filter head 12 in the critically required correct position.

In order to achieve this relatively flat "torque vs rotational angle" behavior, it is has been found preferable to choose a material with a comparatively low Young's modulus for the rotational position tolerance improving retainer ring 18. A low Young's Modulus indicates a low amount of force required for a set amount of deformation. In our development testing, we have found that 3003 H14 aluminum provided the critical relatively flat "torque vs rotational angle". In our tests, for example, flat stainless steel and aluminum rotational position tolerance improving retainer rings were assembled at a 100 Nm torque. Between the two flat retainer rings, the bayonet connector's final position can be rotated 10% further with the aluminum ring, providing critical flatter "torque vs angle" behavior with the aluminum rings, thereby allowing the rotational locked/unlocked positions of the filter 20 on the bayonet connector 14 to properly correspond to the locked/unlocked indicator 58 of the filter head 12. However, as the critical proper rotational alignment of the alignment of the threaded bayonet connection adapter 14 relative to the filter head 12 is critical for the correct open/closed indicator operation, an even wider range of the critical flatter "torque vs angle" behavior is required.

To address the issue noted above, the retainer ring 18 is designed to yield a large window of assembly torque in order to be able to overcome the stack up of tolerances. For example, the retainer ring 18 may be made of a material (e.g., a metal) with a low modulus of elasticity (e.g., less than or equal to 150 gigapascals (GPa)) such as aluminum, brass, copper, or combinations thereof. In a specific example, the rotational position tolerance improving retainer ring 18 is preferably made of 3003 aluminum with a modulus of elasticity of 68.9 GPa. Such a material would require applying only a low amount of tightening torque to the bayonet connector 14 in order to deform the retainer ring 18 by a predetermined amount. Thus, the retainer ring 18 may be designed to deform under low load and thereby enable both tightening the bayonet connector 14 to within the predetermined torque range and adjusting the bayonet connector 14 to the predetermined angular orientation.

Figure 9:
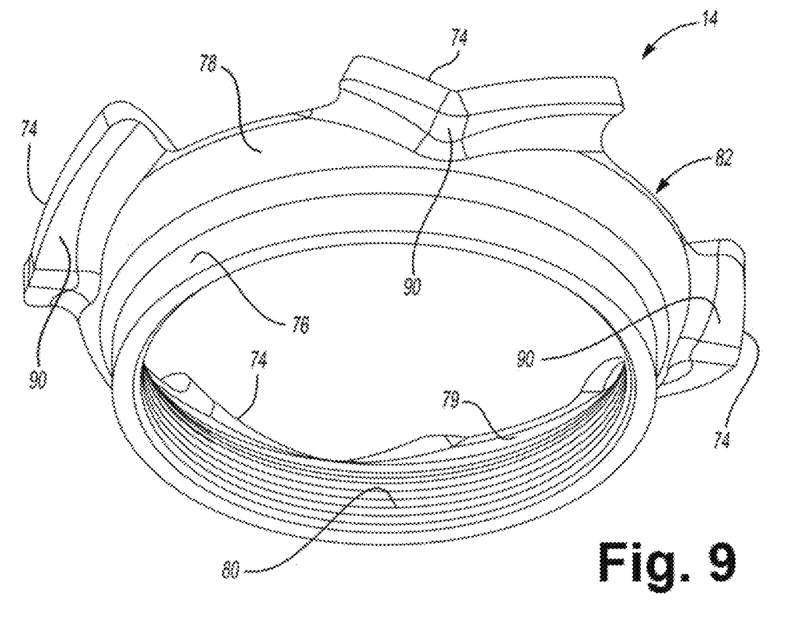
FIG. 9 is a perspective view of the threaded bayonet connection adapter of FIG. 1.
Figure 10:
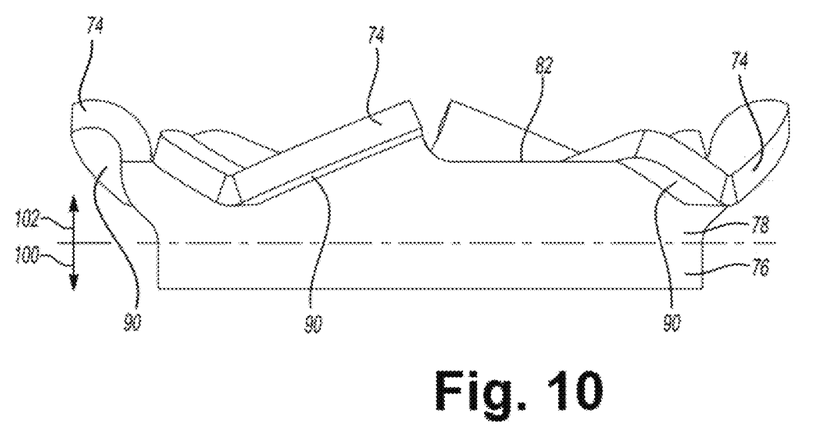
FIG. 10 is a side view of the threaded bayonet connection adapter of FIG. 1.
Figure 11:
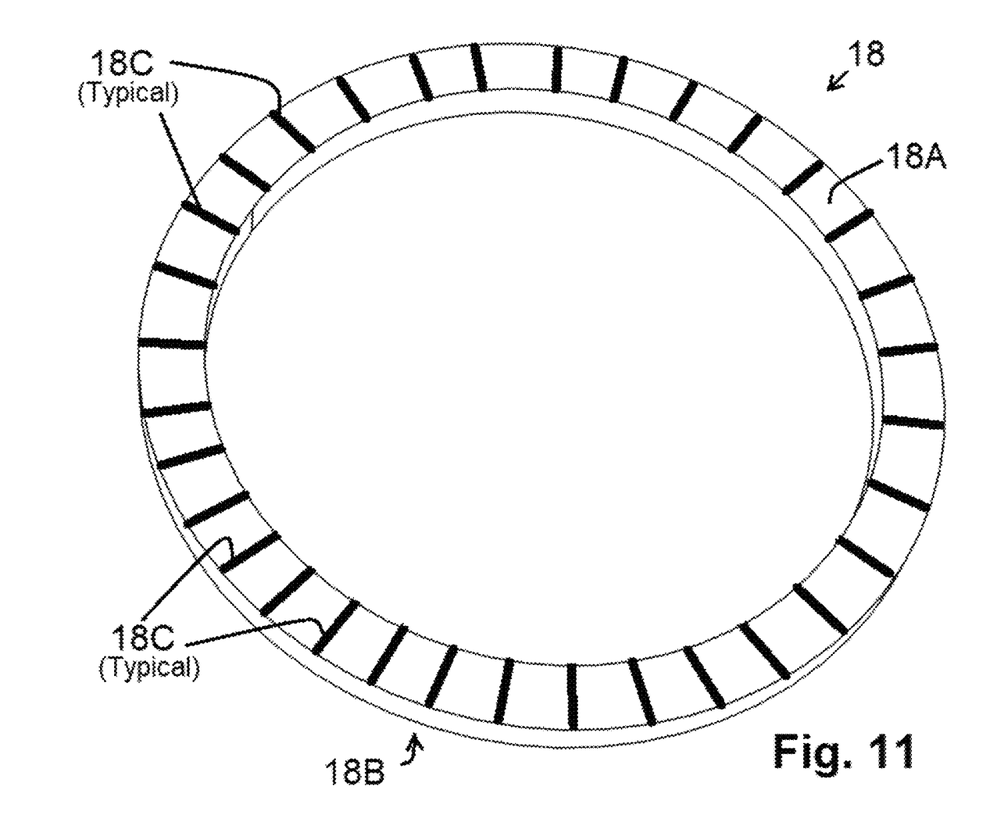
FIG. 11 is a schematic top perspective view of a rotational position tolerance improving retainer ring of the threaded bayonet connection adapter of FIGS. 9 and 10, having radially elongated axially projecting projections on one or both axial faces of the rotational position tolerance improving retainer ring of FIGS. 3, 4, 7 and 8, thereby critically providing for further deformation of the rotational position tolerance improving retainer ring beyond the predetermined final assembly torque to achieve the critical final rotational position for the correct operation of the open and locked position indicators on the filter head.

FIG. 11 shows a rotational position tolerance improving retainer ring 18 of the threaded bayonet connection adapter of FIGS. 9 and 10, having a axial top end face 18A and opposite bottom end face 18B. In FIG. 11. The rotational position tolerance improving retainer ring 18 is provided with a plurality of deformable radially arranged axial projections 18C formed onto on or both of the end faces 18A, 18B. Preferably the deformable radially arranged axial projections have a rectangular cross-section. The deformable radially arranged axial projections 18C provide for a larger flattened torque range after the threaded bayonet connection adapter 14 is tightened onto the filter head 12 to at least a predetermined final assembly torque, providing additional rotation of the threaded bayonet connection adapter 14 on the filter head 12 to the required rotational position on the filter head 12 such the open and locked position indications on the filter head agree with the actual open and locked positions of the filter element on the filter head. This is critical to a correct operation of the open and locked position indicators on the filter head.

Figures 12A, 13:
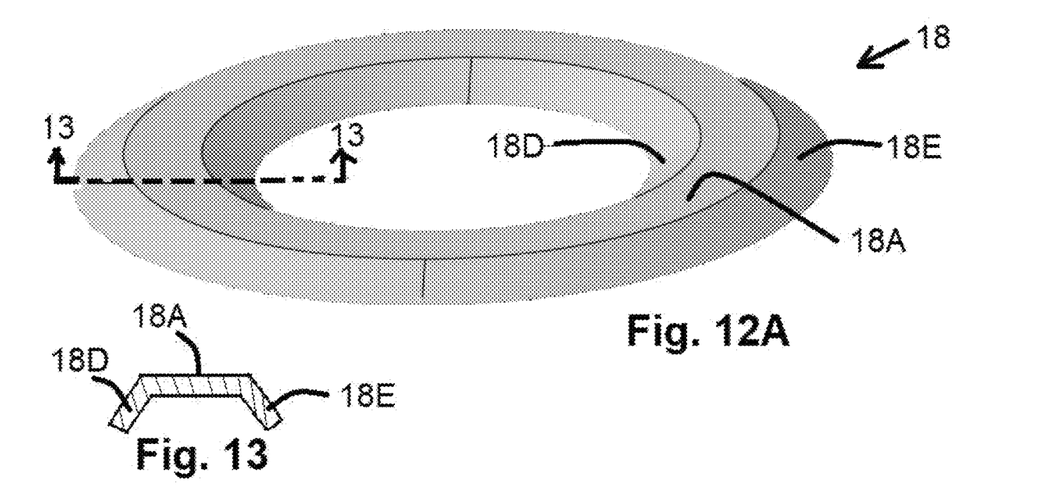
FIG. 12A is a schematic top perspective view of another aspect of the rotational position tolerance improving retainer ring of the threaded bayonet connection adapter of FIGS. 9 and 10, having a deformable U-shaped cross section, the rotational position tolerance improving retainer ring, and according to FIGS. 3, 4, 7 and 8, thereby providing for the critical further deformation of the rotational position tolerance improving retainer ring beyond the predetermined final assembly torque to achieve the critical final rotational position for the correct operation of the open and locked position indicators on the filter head.
FIG. 13 is a sectional view of the rotational position tolerance improving retainer ring of FIGS. 12A and 12B, taken along section line 13.
Figure 12B:
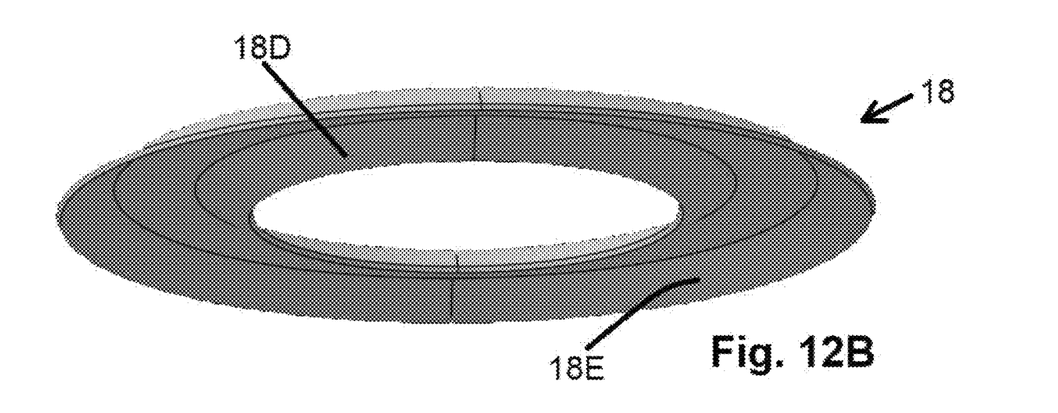
FIG. 12B is a schematic bottom perspective view of a rotational position tolerance improving retainer ring of the threaded bayonet connection adapter of FIG. 12A.

FIGS. 12A, 12B and 13 show another aspect of a rotational position tolerance improving retainer ring 18 of the threaded bayonet connection adapter of FIGS. 9 and 10, having a deformable generally U-shaped cross section (FIG. 13), the rotational position tolerance improving retainer ring 18, according to FIGS. 3, 4, 7 and 8, thereby providing for the critical further deformation of the rotational position tolerance improving retainer ring 18 (FIG. 12A-13) beyond the predetermined final assembly torque to achieve the critical final rotational position for the correct operation of the open and locked position indicators on the filter head. This is critical to a correct operation of the open and locked position indicators on the filter head. As shown in FIGS. 12A, 12B and 13, the rotational position tolerance improving retainer ring 18 of FIG. 12A is substantially U-shaped, having a center end face 18G, a radially outer slanted leg 18E and a radially inner slanted leg 18D. The substantial U-shape of the rotational position tolerance improving retainer ring 18 provides for critical further deformation of the rotational position tolerance improving retainer ring 18 beyond the predetermined final assembly torque to achieve the critical final rotational position for the correct operation of the open and locked position indicators on the filter head, the deformation occurring by the deflection of the slanted legs 18D and 18E during compression of the rotational position tolerance improving retainer ring 18 between the threaded bayonet connection adapter 14 and the filter head 12. This is critical to a correct operation of the open and locked position indicators on the filter head.

Figure 14:
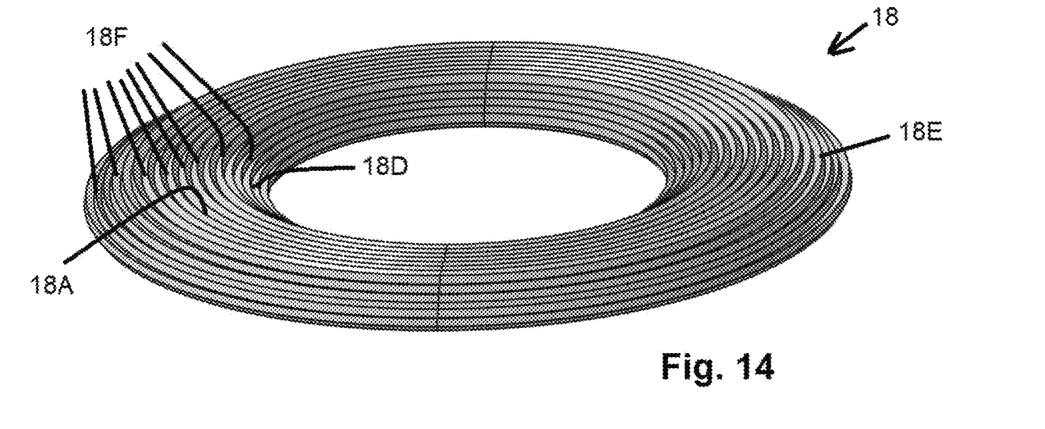
FIG. 14 is a schematic top perspective view of another aspect of the rotational position tolerance improving retainer ring of the threaded bayonet connection adapter of FIGS. 9 and 10, having a plurality of concentrically arranged and radially spaced axially projecting rings formed on the axial face of the rotational position tolerance improving retainer ring, thereby critically providing for further deformation of the rotational position tolerance improving retainer ring beyond the predetermined final assembly torque to achieve the critical final rotational position for the correct operation of the open and locked position indicators on the filter head.

FIG. 14 is a schematic top perspective view of another aspect of the rotational position tolerance improving retainer ring 18 of the threaded bayonet connection adapter of FIGS. 9 and 10. Similar to FIGS. 12A, 12B and 13 and including a plurality of concentrically arranged and radially spaced projecting rings 18F formed on the axial face of the rotational position tolerance improving retainer ring 18, thereby critically providing for further deformation of the rotational position tolerance improving retainer ring 18 beyond the predetermined final assembly torque to achieve the critical final rotational position for the correct operation of the open and locked position indicators on the filter head 12. As shown in FIG. 14, the rotational position tolerance improving retainer ring 18 of FIG. 14 is substantially U-shaped, having a center end face 18G, a radially outer slanted leg 18E and a radially inner slanted leg 18D. The plurality of concentrically arranged and radially spaced projecting rings 18F are arranged on at least the center end face 18G and may be arranged on one or both of the slanted legs 18D, 18E.

Referring now to FIGS. 9 and 10, an example method of forming the bayonet connector 14 will now be described. The method includes drawing a blank in a first direction 100 to form the first portion 76 of the annular body 72 and drawing the blank in a second direction 102 to form the second portion 78 of the annular body 72 and the tabs 74. The second direction 102 is opposite of the first direction 100. The method further includes forming the internal threads 80 on the inner radial surface 79 of the annular body 72 using, for example, a tap and die.

The example method of forming the bayonet connector 14 described above is enabled at least in part by the threaded connection between the bayonet connector 14 and the filter head 12. Without this threaded connection, a bayonet connector (not shown) may need to include fastener tabs through which fasteners may be inserted to attach the bayonet connector to the filter head 12. The fastener tabs may need to be disposed within a common plane, and therefore the remainder of the bayonet connector may be formed by deep drawing a blank in a single direction away from that plane. As a result, the wall thickness of the bayonet connector may be limited, and the bayonet connector may experience a thinning effect during the drawing operation that may lead to microcracks in the bayonet connector. The fatigue life of the bayonet connector may be improved by subjecting the bayonet connector to shot peening after the drawing process and placing a stabilizing ring (not shown) on top of the bayonet connector. However, such measures increase the cost and complexity of the overall assembly.

In contrast the such a single-direction drawing process, the above-described two-directional drawing process of forming the bayonet connector 14 enables the bayonet connector 14 to have a thicker wall thickness. In turn, the bayonet connector 14 may achieve better robustness and a longer fatigue life without taking measures such as subjecting the bayonet connector 14 to shot peening after the drawing process or placing a stabilizing ring on top of the bayonet connector 14. As a result, the cost of the filter head assembly 10 may be minimized relative to other filter head assemblies.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A filter head assembly comprising:
   a filter head configured to be attached to an engine block and to enable oil flow between the engine block and an oil filter connected to the filter head, the filter head including:
   a base; and
   a tubular body protruding from the base, the tubular body defining threads;

and a threaded bayonet connection adapter configured to connect the oil filter to the filter head via a bayonet connection, the threaded bayonet connection adapter including an annular body defining threads configured to engage the threads on the tubular body of the filter head to attach the threaded bayonet connection adapter to the filter head;

a rotational position tolerance improving retainer ring, which is annular and is arranged on the tubular body and compressed between the filter head and the threaded bayonet connection adapter, wherein the rotational position tolerance improving retainer ring is configured to deform under a compression load applied to the threaded bayonet connection adapter when the threaded bayonet connection adapter is rotated on the tubular body and tightened onto the filter head to a predetermined final assembly torque, wherein, upon reaching the predetermined final assembly torque, the rotational position tolerance improving retainer ring is configured to permit further rotation by further deformation at an applied torque in a region near the predetermined final assembly torque so as to permit further rotation to provide rotational alignment of the threaded bayonet connection adapter to a required rotational position on the filter head wherein the threaded bayonet connection adapter further includes tabs protruding radially outward from the annular body thereof and configured to be inserted into corresponding slots in an axial end wall of the oil filter;

a spring arranged on the filter head and configured to bias the oil filter away from the filter head and thereby inhibit rotation of the tabs on the threaded bayonet connection adapter out of the slots in the oil filter.

2. The filter head assembly of claim 1 wherein:
the rotational position tolerance improving retainer ring includes
an axial top end face; and
an axial bottom end face;
wherein a plurality of deformable radially extending axial projections are formed on the axial top end face, the axial bottom end face; or on both of the axial top end face the axial bottom end face;
wherein the axial projections project axially outwardly away from the rotational position tolerance improving retainer ring.

3. The filter head assembly of claim 1 wherein:
the rotational position tolerance improving retainer ring has a substantially U-shaped cross-section, the rotational position tolerance improving retainer ring having:
an annular center end face;
an annular radially outer slanted leg;
an annular radially inner slanted leg;
wherein the slanted legs together with the annular center end face form the substantially U-shaped cross-section,
wherein the U-shaped cross-section provides the further rotation of the rotational position tolerance improving retainer ring beyond the predetermined final assembly torque to achieve the required rotational position on the filter head by the further deformation and deflection of the slanted legs.

4. The filter head assembly of claim 3, wherein:
at least the annular center end face includes
a plurality of concentrically arranged and radially spaced projecting rings formed on the annular center end face and projecting axially outwardly therefrom, whereby the further rotation of the rotational position is further provided by further deformation of the plurality of concentrically arranged and radially spaced projecting rings.

5. The filter head assembly of claim 1 wherein:
the base of the filter head includes a disc-shaped body; and
the tubular body protrudes from disc-shaped body along a central axis thereof.

6. The filter head assembly of claim 1 wherein:
the threads on the filter head are external threads on an outer radial surface of the tubular body; and
the threads on the threaded bayonet connection adapter are internal threads on an inner radial surface of the annular body.

7. The filter head assembly of claim 1 wherein
the annular body of the threaded bayonet connection adapter includes
a first portion having a straight sidewall; and
a second portion having a curved sidewall;
the first portion of the annular body defining the threads on the annular body,
the tabs protruding radially outward from an axial end of the second portion of the annular body.

8. The filter head assembly of claim 1 wherein
the spring is arranged between the threaded bayonet connection adapter and the filter head, the threaded bayonet connection adapter holding the spring in place relative to the filter head.

9. The filter head assembly of claim 8 wherein:
the spring includes
straight segments disposed in a common plane; and
U-shaped segments joining the straight segments to one another and protruding out of the plane;
wherein the straight segments of the spring are configured to be clamped between the rotational position tolerance improving retainer ring and the filter head; and
wherein the U-shaped segments of the spring are configured to apply a biasing force to the axial end wall of the oil filter urging the oil filter away from the filter head.

10. The filter head assembly of claim 1 wherein
the rotational position tolerance improving retainer ring is made of aluminum, brass, copper, or combinations thereof.

11. The filter head assembly of claim 1 wherein
the tabs have V-shaped lower surfaces configured to engage corresponding V-shaped upper surfaces of the axial end wall of the oil filter adjacent to the slots to inhibit rotation of the tabs out of the slots.

12. The filter head assembly of claim 11 wherein
the filter head assembly is configured to hold the oil filter in place relative to the engine block when the axial end wall of the oil filter is pressed toward the filter head to overcome a biasing force of the spring and the oil filter is rotated relative to the filter head until the tabs on the threaded bayonet connection adapter are received in the slots on the axial end wall of the oil filter and the V-shaped lower surfaces on the tabs engage the V-shaped upper surfaces of the axial end wall.

13. The filter head assembly of claim 1 wherein:
the filter head is made of aluminum; and
the threaded bayonet connection adapter is made of steel.

14. The filter head assembly of claim 1 wherein:

the threads on the filter head are external threads on an outer radial surface of the tubular body of the filter head; and the threads on the threaded bayonet connection adapter are internal threads on an inner radial surface of the annular body of the threaded bayonet connection adapter; and the threaded bayonet connection adapter further includes tabs protruding radially outward from the annular body of the threaded bayonet connection adapter and configured to be inserted into corresponding slots in an axial end wall of the oil filter.

\* \* \* \* \*